Figure 7:
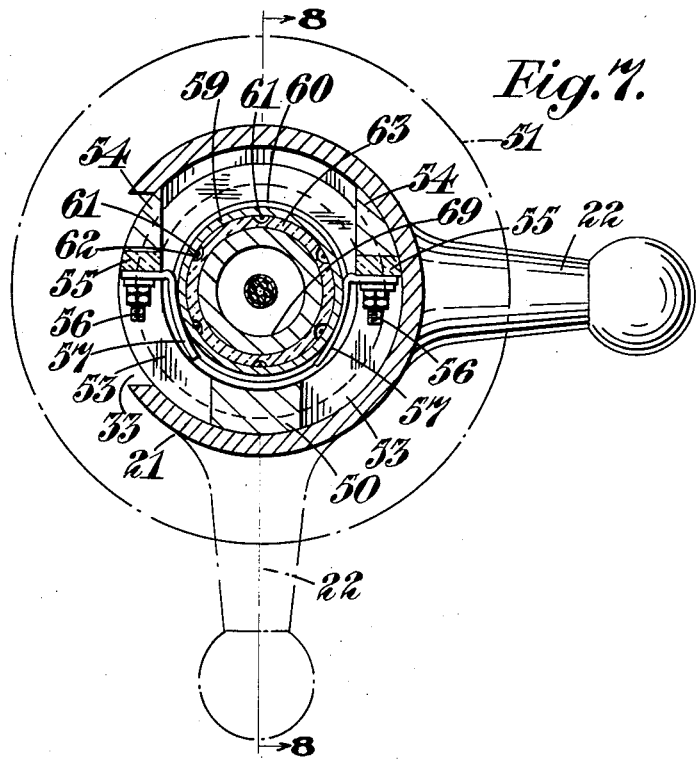

Jan. 12, 1932.  L. BURN  1,841,008
COUPLING
Filed April 11, 1930    4 Sheets-Sheet 1
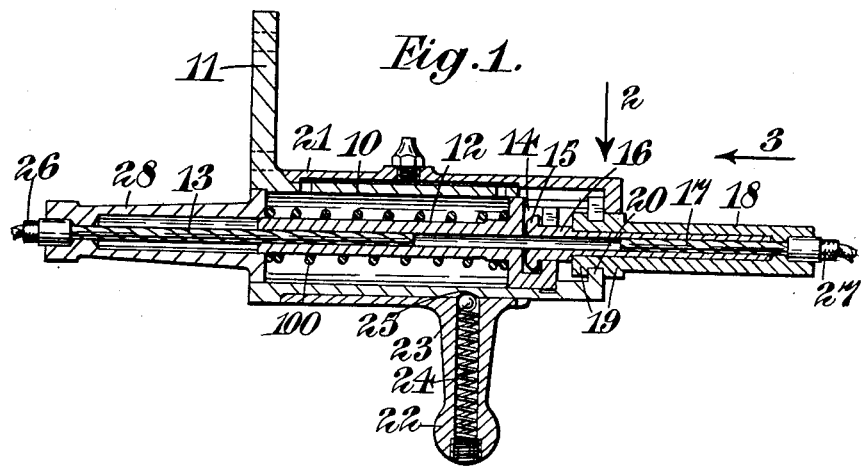
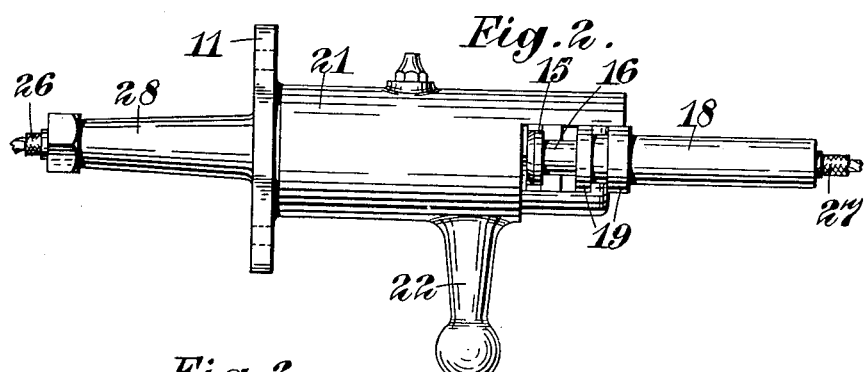
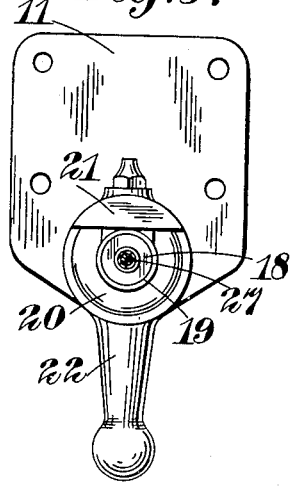
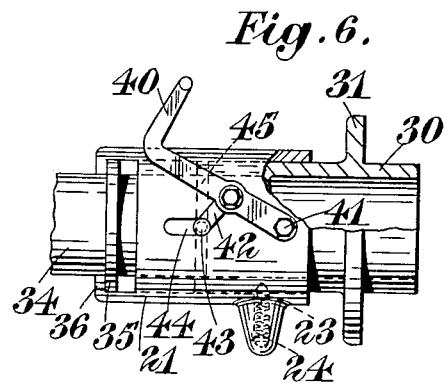
INVENTOR
Lewis Burn,
By Watson, Coit, Morse & Grindle
ATTYS Jan. 12, 1932.  L. BURN  1,841,008
COUPLING
Filed April 11, 1930  4 Sheets-Sheet 2
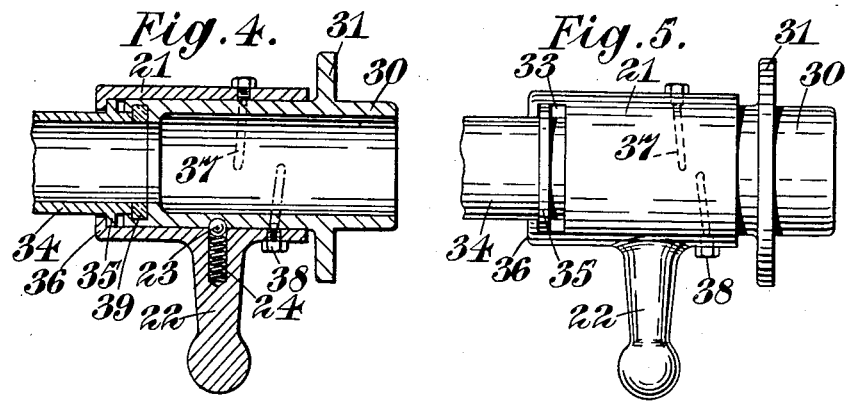
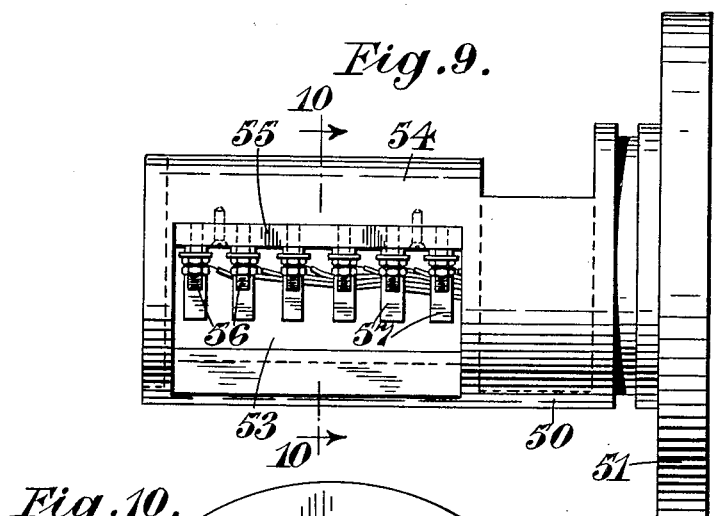
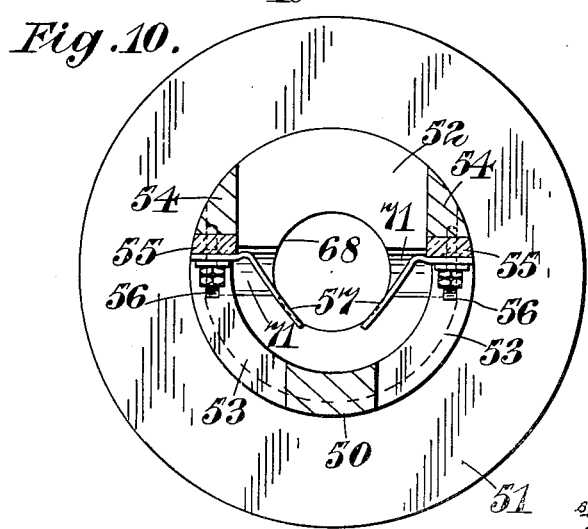
INVENTOR
Lewis Burn,
By Wilson, Coit, Morse & Grindle
Attys Jan. 12, 1932.  L. BURN  1,841,008
COUPLING
Filed April 11, 1930  4 Sheets-Sheet 3

INVENTOR
Lewis Burn,
By
Watson, Coit, Morse & Grindle
ATT'ys

Jan. 12, 1932. L. BURN 1,841,008
COUPLING
Filed April 11, 1930 4 Sheets-Sheet 4

INVENTOR
Lewis Burn
by Watson, Coit, Morse & Grindle
Attys

Patented Jan. 12, 1932

1,841,008

UNITED STATES PATENT OFFICE

LEWIS BURN, OF LONDON, ENGLAND, ASSIGNOR OF ONE-HALF TO CHARLES FREDERICK CLAPHAM, OF SURREY, ENGLAND

COUPLING

Application filed April 11, 1930, Serial No. 443,541, and in Great Britain April 19, 1929.

This invention is for improvements in or relating to couplings and has for its object to provide means for rapidly attaching and detaching shafts, drawbar elements, electric cables, fluid conduits and the like.

This invention provides coupling means for shafts, cables and the like, comprising two members, one of which is formed with an aperture into which the second member may be completely or partly inserted and a locking element, or elements, movable over the aperture to prevent the removal of the second said member therefrom. Preferably the two members are engageable by relative lateral movement between them and the locking element is arranged for rotational movement relative to the apertured member to close, or partly close, the aperture. This invention also provides improved coupling means for shafts, cables or the like, comprising two coupling members formed at their ends one with a key or the like and the other with a key-way which extend transversely of the length of the coupling members and are engageable by relative lateral movement between them, combined with a locking element or elements on one or both coupling members movable to lock said members against relative lateral movement of a degree sufficient to break the keyed engagement between them. The locking member may be a sleeve rotatable upon that coupling member in which the keyway is formed to cover and uncover the entrance opening or openings of the keyway.

In a modified construction according to this invention the locking element may be provided with a breach through which one of the members may be inserted laterally and which locking element may be movable axially to close the breach.

In one embodiment of the invention applied to the coupling of two conduits end to end, the coupling device comprises an annular retaining member which surrounds the end of one conduit and has in it a breach through which the end of the other conduit may be inserted laterally into alignment with the first conduit, and a locking sleeve rotatable on the annular member aforesaid and so arranged that simultaneously with its rotation it is movable axially to draw the end of one conduit into fluid-tight engagement with the end of the other conduit and at the same time to close the breach in the annular member aforesaid.

Figure 8:
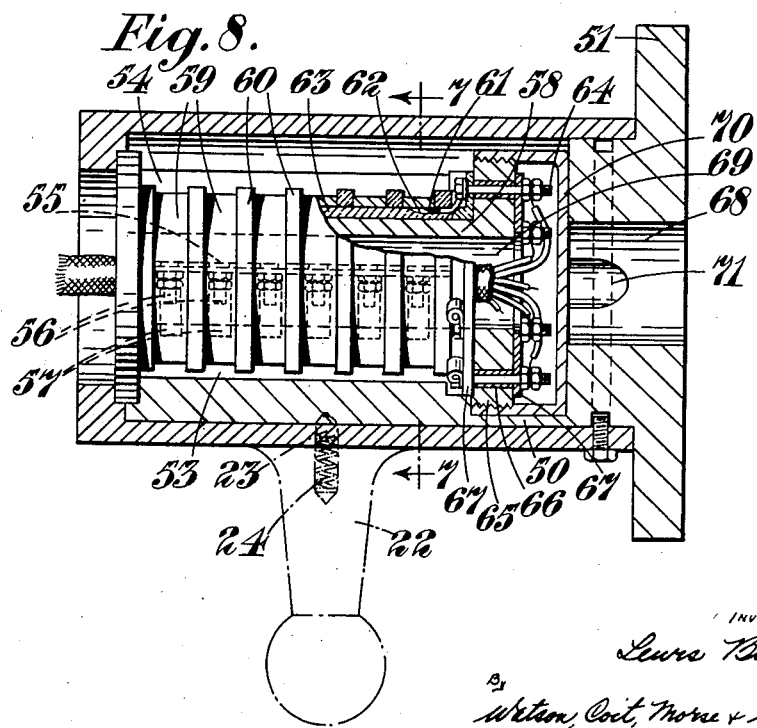
Figure 11:
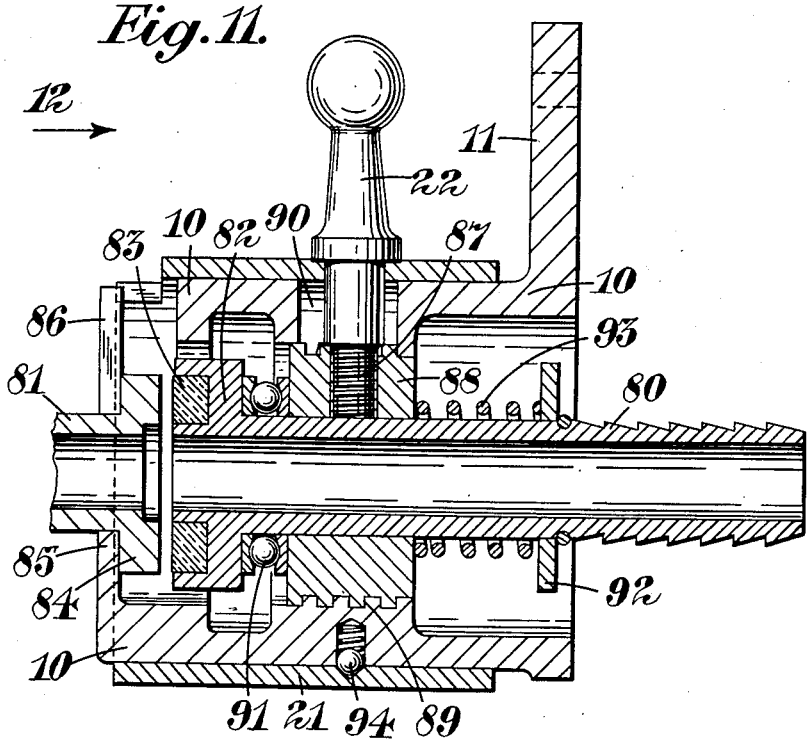
Figure 12:
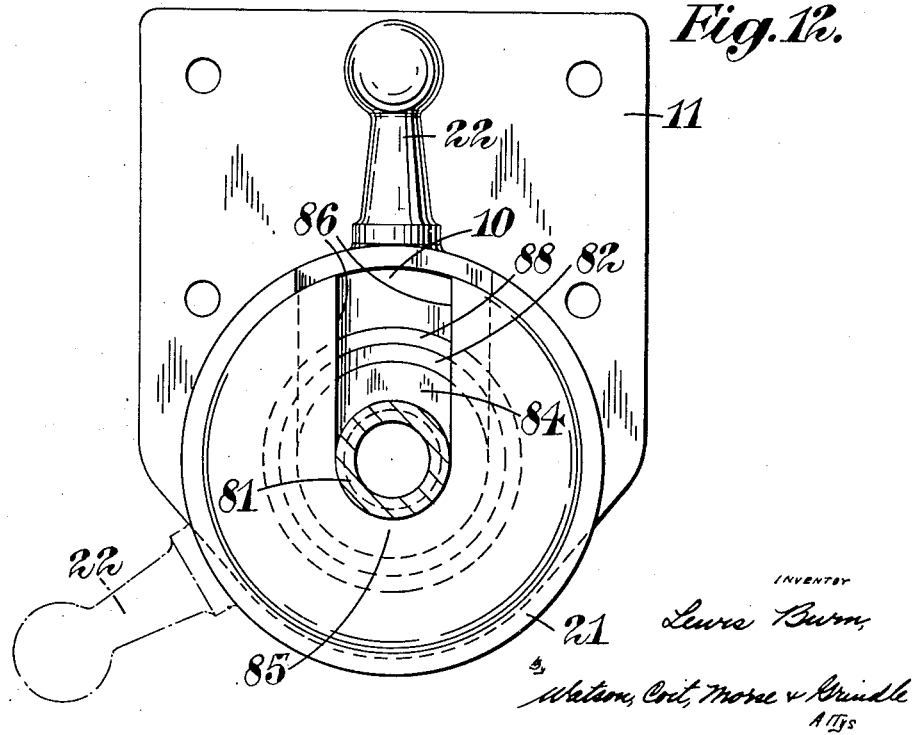

Various constructions according to this invention will now be described in detail by way of example with reference to the accompanying drawings in which, Figure 1 is a longitudinal section through a coupling for cables, Figure 2 is a plan view of the coupling shown in Figure 1, but with the locking element in the open position, Figure 3 is an end view looking in the direction of the arrow 3 in Figure 1, Figure 4 is a longitudinal section through a coupling for fluid conduits, Figure 5 is an outside elevation of the coupling shown in Figure 4, Figure 6 shows a modified form of the coupling shown in Figures 4 and 5, Figure 7 is a longitudinal section through a coupling for electrical cables taken on line 7—7 of Figure 8, Figure 8 is a section taken on the line 8—8 in Figure 7 and looking in the direction of the arrows, Figure 9 is an elevation of one member of the coupling shown in Figures 7 and 8, Figure 10 is a section taken on the line 10—10 in Figure 9 and looking in the direction of the arrows, Figure 11 is a longitudinal section of an alternative coupling device of conduits, and Figure 12 is an end view of this alternative coupling device.

Throughout this description like reference numerals indicate like parts.

The coupling illustrated in Figures 1 and 2 is arranged to provide means for rapidly connecting and disconnecting the two ends of a cable such as a "Bowden" wire cable for example interconnecting the brakes upon a lorry and a trailer. The coupling comprises a cylindrical casing 10 (constituting one of the main coupling members) having a flange 11 for attachment to any convenient member (e. g. upon the lorry or the trailer). Within this casing 10 is a slidably mounted cable element 12 to which member the end of one of the Bowden wires 13 is swaged. The cable element is provided at its inner end with a transverse slot 14 forming a keyway into which a flange 15 upon the end of a key member 16 may be dropped. The end of the second cable 17 is swaged into the cable element 16. Surrounding the cable element is a sleeve 18 (constituting the other main coupling member) having two projecting flanges 19 between which is engaged an inwardly projecting flange 20 upon the end of the casing 10, the latter being provided upon its periphery with a breach 108 which permits the introduction by lateral movement of the key member and its sleeve. Surrounding the casing 10 is a cover, or locking element 21, having a portion of its periphery removed (as shown in Figure 2) to provide a breach 109 through which the cable element 16 and its casing 18 may be inserted and withdrawn. The locking member 21 is rotatable by means of a handle 22 to cover the breach 108 and to prevent the lateral separation of the two coupling members. Within the handle 22 is a ball 23 which is pressed by a spring 24 into one of two countersunk holes 25 in the casing 10 to retain the locking member in the open, or in the closed position. The sheaths 26 and 27 of the two cables 13 and 17 respectively are arranged to abut the one upon a cylindrical extension 28 of the casing 10 and the other upon the sleeve 18.

It will be seen that the bore of the casing 10 and that of the cylindrical extension 28, accommodates the to and fro movement of the cable element 12 and the connected key member 16 which will take place on the application of the brakes. Movement in a direction towards the left in Figure 1 is opposed by a spring 100 surrounding the cable element 12.

Figures 4 and 5 illustrate a coupling for fluid conduits. The coupling comprises a member 30 having a flange 31 for attachment to any convenient support. Surrounding the member 30 is a locking element 21 provided at one end with a breach 33 through which the second member 34 of the coupling may be offered laterally. The member 34 is provided with a flange 35 which is arranged to engage with an inwardly projecting flange 36 on the locking element 21. Formed on the periphery of the member 30 are two spiral grooves 37 which are slidably engaged by bolts 38 passing through the locking element 21. The operation of the device is as follows:—

The member 34 is passed laterally through the breach 33 until it is in axial alignment with the member 30. The handle 22 is now rotated, causing the locking element 21 to move axially over the member 30, thus forcing the inner end of the member 34 into end-on engagement with a resilient joint-washer 39 carried in a recess in the interior of the member 30. A fluid-tight joint is thus formed between the members 30 and 34. The locking element 21 is retained in its open or closed position by means of a spring-pressed ball 23 as described with reference to Figures 1 and 2.

In the modification illustrated in Figure 6 a lever 40 is pivoted at 41 to the locking element 21 and carries a link 42 provided at its free end with a pin 43 which projects through a slot 44 in the locking element and engages an annular recess 45 in the member 30. The axial movement of the locking element 21 necessary to force the member 34 into engagement with the joint-washer 39 is effected by depressing the lever 40, which increases the distance between the pin 43 and the pivot 41. The lever 40 is arranged to move below the centre line so that it is self-locking.

Figures 7, 8, 9 and 10 illustrate a coupling for electric cables. The coupling comprises a cylindrical member 50 provided with a flange 51, which member is slotted longitudinally to form a breach 52 and is further pierced at each side with apertures 53. To the walls, or ribs, of metal 54 separating the breach 52 from the apertures 53 are attached strips of insulating material 55 each of which carries six terminals 56 and inwardly projecting brushes 57. The second part of the coupling is formed by a cylindrical bobbin indicated generally by the numeral 58 provided with six metal contact rings 59 insulated from each other by non-conducting rings 60. A lead 61 is carried, from each ring 59, in a recess 62 formed in an interior sleeve 63 of non-conducting material, to a binding post 64 in one end flange 65 of the bobbin 58. Each binding post, of which there are six in all, is insulated from the metal flange 65 by a sleeve 66 and washers 67 of insulating material.

The six strands from one cable are taken through the aperture 68 in the flanged end of the member 50 and slots 71 and are connected to the six binding posts 56 on one side. Alternatively, connections may be made to alternate binding posts upon each side but whichever of these methods is adopted, connections will be taken between the corresponding binding posts on each side to make both sets of brushes 57 operative and to increase the contact area. In a further construction the brushes 57 may be replaced by flat extension springs extending across between each pair of binding posts 56. The six strands of the other cable are taken through the interior 69 of the bobbin 58 and are bent outwards and attached to the binding posts 64; the ends of the strands and the binding posts are protected by a cover 70. Surrounding the member 50 is a locking element 21 provided with a breach 33 which may be turned until it corresponds with the breach 52. The bobbin 58 is then entered laterally through the two breaches and the brushes 57 each make contact with their respective rings 59 upon the bobbin. The locking element 21 may then be rotated into the position shown in Figure 8 to cover the breach and prevent lateral disengagement of the bobbin.

The coupling illustrated in Figures 11 and 12 will now be described. The device illustrated is for the purpose of coupling together end to end two conduits 80, 81. The conduit 80 has a flanged end 82 within a recess in which is received a resilient washer 83. The conduit 81 has a flanged end 84 arranged to abut on the washer 83 and to make a fluid-tight joint when the coupling device is closed. The coupling device comprises a cylindrical casing 10 provided at one end with a flange 11 for attachment to any convenient support. At the other end the casing is formed with an inturned rib 85 for the purpose of engaging on the outside of the flange 84 of the conduit 81. The casing 10 is formed with a breach 86 through which the end of the conduit 84 may be offered. Surrounding the casing 10 is a locking sleeve 21 rotatable on the casing by means of a handle 22. The handle 22 is formed with an extension 87 which is screwed into an annular member 88 which surrounds the conduit 80. The member 88 is free to rotate on and move axially on the conduit 80. The periphery of the member 80 is screwthreaded as shown at 89 and engaged by a co-operating internal screwthread on the casing 10. A slot 90 is provided in the casing 10 to accommodate rotational and axial movement of the handle extension 87 in relation to the casing. Between the annular member 88 and the flange 82 of the conduit 80 a thrust bearing 91 is located, and on the opposite side between the member 88 and a disc 92 secured to the conduit 80, a spring 93 is located.

This device operates in the following way. To make the coupling the flange 84 of the conduit 81 is inserted through the breach 86 in the casing 10 and is thereby brought into alignment with the conduit 80. The handle 22 is now turned through 120° thereby rotating the locking sleeve 21 and the annular member 88. By virtue of the screw-threaded engagement 89 the annular member 88 and the sleeve 21 are moved axially in a direction towards the left in Figure 11, thus forcing the flanged end 82 of the conduit 80 into abutment with the flanged end 84 of the conduit 81. A fluid-tight joint is thus effected by means of the washer 83. Axial movement of the sleeve 21 at the same time encloses the breach 26 in the casing 10 and thereby prevents lateral separation of the two conduits. When the coupling is to be opened the handle 2 is rotated in the opposite direction. The locking sleeve 21 is retained in its locked position by means of a spring-pressed ball 94.

I claim:—

1. In a coupler for cables the combination of two coupling members, cooperating laterally engageable key and keyway devices formed on the two said coupling members, two cable elements for the attachment of two cables, one element slidably mounted in each of the coupling members, and cooperating laterally engageable key and keyway devices formed on the two said cable elements, whereby one coupling member and its cable element may be moved laterally into and out of key and keyway connection with the other coupling member and its cable element.

2. In a coupler for cables, the combination of a coupling member, a cable element slidably mounted therein for the attachment of a cable, a second coupling member and a second cable element slidably mounted therein for the attachment of another cable and cooperating means on said elements and members whereby the two coupling members and the two cable elements may be simultaneously coupled together.

3. In a coupler for cables, the combination of a coupling member, a cable element slidably mounted therein for the attachment of a cable, a second coupling member and a second cable element slidably mounted therein for the attachment of another cable and means for simultaneously coupling together the two coupling members and the two cable elements by relative lateral movement between them.

4. In a coupler for cables, the combination of a coupling member, a cable element slidably mounted therein for the attachment of a cable, a second coupling member and a second cable element slidably mounted therein for the attachment of another cable, and means for simultaneously bringing the two coupling members into key and keyway engagement and the two cable elements into key and keyway engagement.

5. In a coupler for cables, the combination of a coupling member, a cable element slidably mounted therein for the attachment of a cable, a second coupling member and a second cable element slidably mounted therein for the attachment of another cable, and means for simultaneously bringing the two coupling members into key and keyway engagement and two cable elements into key and keyway engagement by relative lateral movement.

6. In a coupler for cables, the combination of a coupling member, a cable element slidably mounted therein for the attachment of a cable, a second coupling member and a second cable element slidably mounted therein for the attachment of another cable, and means for simultaneously interlocking the respective coupling members and the respective cable elements.

7. In a coupler for cables, the combination of a coupling member, a cable element slidably mounted therein for the attachment of a cable, a second coupling member and a second cable element slidably mounted therein for the attachment of another cable and means for simultaneously interlocking the respective coupling members and the respective cable elements by relative lateral movement.

8. In a coupler for cables, the combination of a coupling member, a cable element slidably mounted therein for the attachment of a cable, a second coupling member and a second cable element slidably mounted therein for the attachment of another cable, means for simultaneously interlocking the respective coupling members and the respective cable elements, and a locking sleeve mounted on one of said coupling members and rotatable to maintain the aforesaid interlock.

9. In a coupler for cables, the combination of a coupling member formed with a slotted internally projecting flange, a cable element slidably mounted in said member and formed at one end with a transverse slot, a second coupling member resting in the slot of the internally projecting flange and formed with two flanges spaced apart thereon with the aforesaid slotted flange between them and a second cable element slidably mounted in said second member and formed at one end with a flange resting in the aforesaid transverse slot, engagement between the respective coupling members and between the respective cable elements being made and broken by relative lateral movement.

10. The combination with apparatus as claimed in claim 9, of a locking sleeve mounted on the first-mentioned coupling member and movable thereon to prevent disengagement of said members and elements.

11. In a coupler for cables, the combination of a coupling member formed with a breach and a key, a cable element slidably mounted in said member and formed with a transverse slot at one end which is exposed by the breach aforesaid, a second coupling member formed at one end with a transverse keyway, a second cable element slidably mounted in said second member and formed at one end with a transverse keyway, said second coupling member and cable element being movable into interlocking engagement respectively with the first member and cable element by simultaneously lateral movement through the breach aforesaid, and a locking sleeve mounted on the first coupling member and movable thereon to cover and uncover the breach.

12. The combination, with apparatus according to claim 2 of a spring inside the first coupling member and surrounding the cable element which is mounted therein and tending to move said element in one direction.

In testimony whereof I affix my signature.

LEWIS BURN.